(12) United States Patent
Ilnicki et al.

(10) Patent No.: US 8,619,981 B2
(45) Date of Patent: Dec. 31, 2013

(54) SYSTEMS AND METHODS FOR PRODUCING PSEUDO-RANDOM NUMBER DISTRIBUTIONS IN DEVICES HAVING LIMITED PROCESSING AND STORAGE CAPABILITIES

(75) Inventors: Slawomir K. Ilnicki, Los Altos Hills, CA (US); Valery Kanevsky, San Lorenzo, CA (US); Martin Curran-Gray, Fife (GB)

(73) Assignee: JDS Uniphase Corporation, Milpitas, CA (US)

( * ) Notice: Subject to any disclaimer, the term of this patent is extended or adjusted under 35 U.S.C. 154(b) by 2912 days.

(21) Appl. No.: 11/127,487

(22) Filed: May 12, 2005

(65) Prior Publication Data

US 2006/0256962 A1 Nov. 16, 2006

(51) Int. Cl.
*H04L 29/06* (2006.01)
(52) U.S. Cl.
USPC ............... 380/46; 380/268; 726/27; 726/28; 726/29; 726/30; 726/31; 726/32
(58) Field of Classification Search
USPC ............... 380/46, 268, 23; 726/9, 20, 27–32; 455/403
See application file for complete search history.

(56) References Cited

U.S. PATENT DOCUMENTS

| | | | | |
|---|---|---|---|---|
| 4,858,932 A * | 8/1989 | Keane | | 463/21 |
| 5,091,942 A * | 2/1992 | Dent | | 380/46 |
| 5,596,641 A * | 1/1997 | Ohashi et al. | | 380/248 |
| 5,794,139 A * | 8/1998 | Mizikovsky et al. | | 455/403 |
| 6,243,811 B1 * | 6/2001 | Patel | | 713/167 |
| 6,272,223 B1 * | 8/2001 | Carlson | | 380/251 |
| 7,085,382 B2 * | 8/2006 | Terao et al. | | 380/247 |
| 7,206,411 B2 * | 4/2007 | Olivier et al. | | 380/262 |
| 7,242,776 B1 * | 7/2007 | Elliot | | 380/278 |
| 7,308,250 B2 * | 12/2007 | Khare et al. | | 455/411 |
| 2003/0091094 A1 | 5/2003 | Epstein | | |
| 2004/0096060 A1 * | 5/2004 | Henry et al. | | 380/46 |
| 2005/0107077 A1 * | 5/2005 | Hintermeier et al. | | 455/419 |

FOREIGN PATENT DOCUMENTS

JP 4123130 4/1992
WO WO 2004 / 017155 2/2004

OTHER PUBLICATIONS

GB Search Report dated Aug. 23, 2006.

* cited by examiner

*Primary Examiner* — David Pearson
*Assistant Examiner* — Josnel Jeudy
(74) *Attorney, Agent, or Firm* — Volentine & Whitt, PLLC

(57) ABSTRACT

Arbitrary numerical distributions are presented for use in devices having limited processing and storage capabilities by having the device accept strings of arbitrarily distributed numbers from a source outside of the device. In one embodiment, a master controller creates a table of values which follow the desired minimum, maximum, mean, and standard deviation, etc. of the particular desired statistical distribution required. The created table is then communicated to the limited capacity device and can be used whenever a distribution of random values is required. The master controller could have one of several slave devices associated with it in the system. In another embodiment, where the storage capability of the device is large enough to store a table of values with sufficient different entries to create a distribution of satisfactory "randomness" for the particular application, a random number generator within the device is used to select the order of presentation of the table of values.

29 Claims, 1 Drawing Sheet

SYSTEMS AND METHODS FOR PRODUCING PSEUDO-RANDOM NUMBER DISTRIBUTIONS IN DEVICES HAVING LIMITED PROCESSING AND STORAGE CAPABILITIES

TECHNICAL FIELD

This invention relates to random number distribution generation and more particularly to systems and methods for producing random number distributions in devices having limited processing and storage capabilities.

BACKGROUND OF THE INVENTION

The usual approach to generating random number distributions is to transform one or more standard uniformly distributed independent random numbers into one or more random variables with a given distribution. Many of these rely on heavy amounts of computational ability, such as is available on a PC and are thus not practical for use in devices, such as cell phones or other small relatively portable devices.

Random number generators can also be created in a purely hardware environment thereby bypassing the need for large storage or CPU capability. A particular type of digital electronic circuit known as a Linear Feedback Shift Register (LFSR) can be used to create a range of "random" values called Pseudo Random Binary Sequences, (PRBS). The properties of these circuits are well known, and their direct output is a Binomial Distribution, the discrete time equivalent of the Poisson Distribution. However, in applications where specific, and possible changing, distribution shaping is required, PRBS's are not adequate. For example, in situations with limited processing power, i.e. pure hardware digital circuitry with little or no access to a microprocessors, the range of random numbers available for use can be severely limited, both in the type of the distribution, and the range of statistical properties within the same distribution type, i.e. minimum, maximum, mean and standard distribution. The available "length" of any sequence may be severely limited before the sequence starts repeating from the beginning. This may lead to situations where the randomness is violated for decent results in the application of interest.

BRIEF SUMMARY OF THE INVENTION

Arbitrary numerical distributions are presented for use in devices having limited processing and storage capabilities by having the device accept strings of arbitrarily distributed numbers from a source outside of the device. In one embodiment, a master controller creates a table of values which follow the desired minimum, maximum, mean, and standard deviation etc. of the particular desired statistical distribution required. The created table is then communicated to the limited capacity device and can be used whenever a distribution of random values is required. The master controller could have one of several slave devices associated with it in the system.

In another embodiment, where the storage capability of the device is large enough to store a table of values with sufficient different entries to create a distribution of satisfactory "randomness" for the particular application, a random number generator within the device is used to select the order of presentation of the table of values.

DETAILED DESCRIPTION OF THE INVENTION

Figure 1:
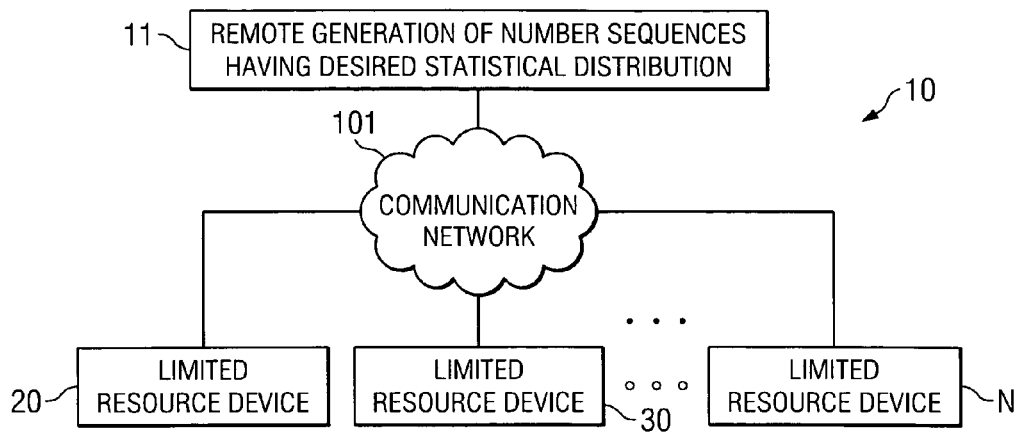
FIG. 1 shows one embodiment of a system in which random number distributions are created.

FIG. 1 shows one embodiment 10 of a system in which random number distributions are created. In the embodiment shown there are a plurality of limited resource devices, such as devices 20, 30 through N, in which it is desired to create an arbitrary numerical distribution. These devices, because of their limited resource capability, do not have large storage or processing capacity and thus cannot generate the necessary random numbers in the statistical sequences desired, nor can such limited resource capacity devices produce high quality random numbers with a certain distribution. The term high quality numbers means that with a given probability density function those numbers satisfy statistical concordance criteria. Such devices, for example, could be application specific integrated circuits (ASIC) or field programmable gate arrays (FPGA) devices with limited resources (processing and/or memory).

Devices 20 and 30 are but two examples of embodiments utilizing the concepts of the invention in which number sequences having the desired statistical distribution for a given period of time are remotely generated. The remote generator has resources to produce high quality numbers, such as statistical distributions, copies of actual events, simulation of actual event according to a distribution, an exponential distribution or simply act as a high quality random number generator. These number sequences are transmitted from the source of generation (which can be a PC or any other source), through a communication network such, as communication network 101 to the limited resource device. Network 101 could be wireline (including media such as fiber), wireless or combinations thereof.

Figure 2:
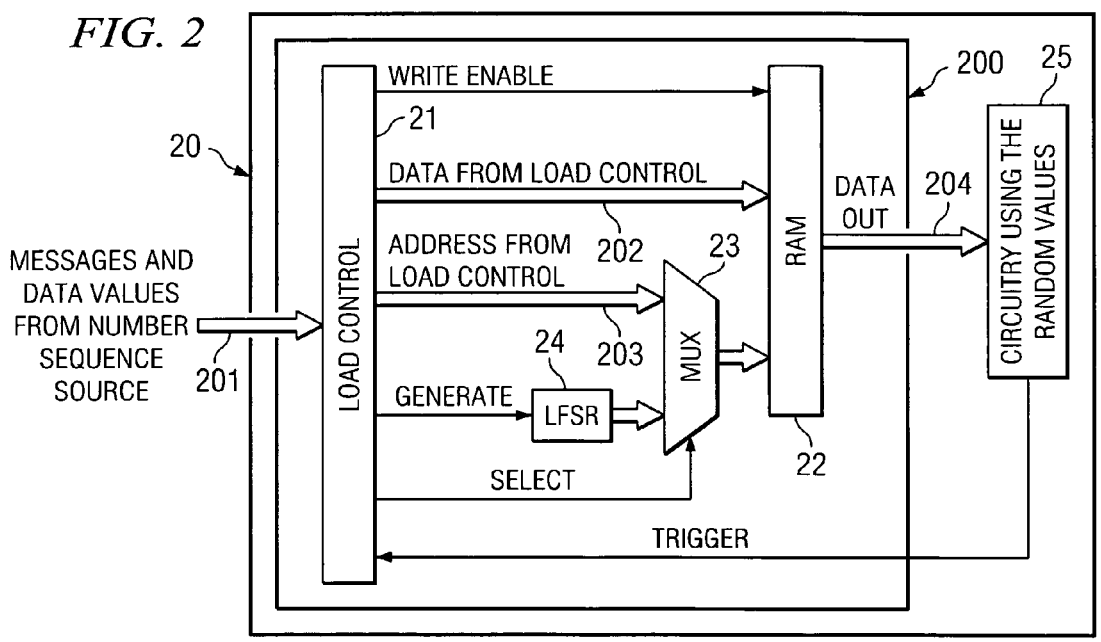
FIGS. 2 and 3 show embodiments of limited resource devices for producing random number distributions.

FIG. 2, shows embodiment 200 illustrating circuitry of limited resource device 20 having a limited amount of memory, such as RAM memory 22. Memory 22 could, for example, be registers or any other type of memory desired. Messages and data values from remote number sequence source 11 (FIG. 1) are input over path 201 to load control 21. Load control 21 then instructs MUX 23 (select input) to accept addresses 203 and to direct those addresses to RAM 22. Under control of write enable, the information coming from remote generator 11 is loaded into RAM at the address locations identified on path 203. When the data is loaded, MUX 23, under the control of the select input, is switched such that MUX 23 is connected to an address selection mechanism that is random, or Pseudo random. One such device that can be used as a pseudorandom generator is a linear feedback shift register, such as (LFSR) 24.

The LFSR is a good choice because it works well on a limited processing environment, but other circuits and methods could be used to generate the necessary randomness. Load control 21 gives a generate instruction to LFSR 24 which then generates a random number. When each input of the LFSR flip-flops are loaded with a seed value (anything except all 0s, which would cause the LFSR to produce all 0 patterns) all that need happen is for the LFSR to be clocked and it will generate a pseudorandom pattern of 1s and 0s. Note that the only signal necessary to generate the number of pattern is the clock. The pseudo random number from LFSR 24 is used to address one line of the previously stored data. This addressed data, which initially was generated by device 11 (FIG. 1), appears on data output 204 to circuitry using the random valves 25.

In one embodiment, the circuitry 25 could be a counter which is set to a number and counts to zero. At zero it produces an output signal. The random number(s) from RAM 22 could be used to provide the "set" point for the counter such that the output pulse (when it is generated) represents the time between certain events. The pattern of the true events that this circuit is trying to mimic was established by remote generator 11 because device 20 does not have the capacity to generate the proper number patterns without external help. The signal from circuitry 25 also is used to trigger load control 21 such that either another pseudorandom address is generated by LFSR 24 to access the data already stored in RAM 22 or to control the storing of new data from remote generator 11.

Note that, if a system has a plurality of limited resource devices 20, each such device could be configured with different initial values for the LFSR so that the output from each device 20 would be different even though they each used the same number sequences from remote generator 11. Also note that the LFSR need only be of sufficient size to create an address bus the width of the RAM address bus. If sufficient resources are available, the output of the LFSR could be a longer address then is necessary, with the address being cut into slices to be used for different cycles if desired. This would allow a table (a download of number sequences) having, for example, 256 entries to be accessed by taking eight address bits from a ten bit LSFR. That would mean that the table would be fully accessed four times for one complete cycle of the LSFR, but the accessing of any one address would be scattered across four access times as opposed to one. Thus, full access and then entry N could be picked four times while entry N+1 may only be picked two times, depending on the method of slicing. This system makes it even more random than using eight bits from the LFSR to select and eight bit address which would produce the same sequence four times in 1024 "clocks."

In certain embodiments the RAM could have a default table so that on power up (or other loss of input data) LFSR 24 could access randomly one of the numerical sequences already stored in RAM 22 while it is waiting for a message from remote generation 11. This loaded data could, for example, be utilized in situations where for bandwidth or other reasons the data is not moved into RAM 22 fast enough or in an interrupted fashion from communication network 101.

The data stored in RAM 22 can be data from a previous download or data provided from a memory device permanently installed in device 20. Whenever it is desired to change the number sequences or to use different random distribution patterns, remote generation 11 changes its pattern of data which is then stored in RAM 22 and the cycle repeats.

Figure 3:
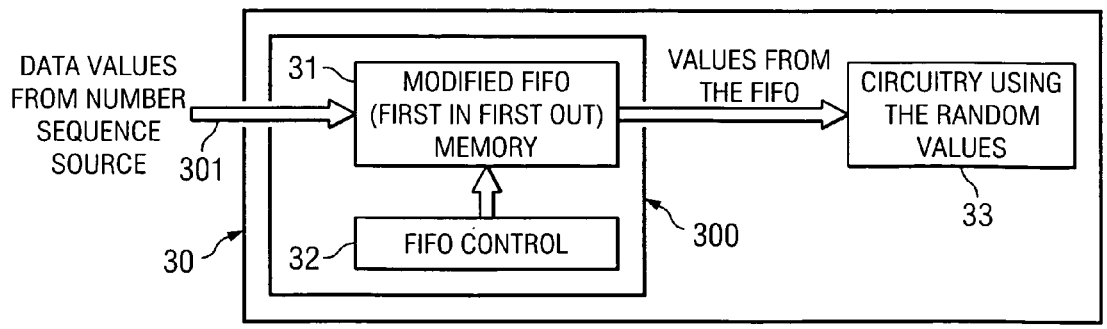

FIG. 3 shows circuitry 300 for use in embodiment 30 where the numbers arriving from the external source, in this case remote generator 11, have a given distribution that further processing within device 30 is not required as it was with respect to device 20. In such a situation a memory having FIFO characteristics, such as FIFO 31, is used to receive data via 301 from remote generation source 11. When the bits pass through FIFO 31 they go directly to the circuitry that is using the random values, such as circuitry 33. In the embodiment of FIG. 3 random values are used directly from remote generation 11 without the pseudo randomness added by LFSR 24 as discussed above with respect to FIG. 2.

Note that as long as the average rate of consumption of the user (device 33) is balanced by the average rate of arrival of new values in messages from remote generation 11, the size of the FIFO need only be large enough to hold the entries in one message give or take a few entries for variable delay in a communication network. Since remote generation 11 has much higher processing and storage capacity than does device 30, much larger sequences of random values are possible than would be possible if the data were to be generated in device 30.

FIFO 31 could be modified to have default values available for power on which value could be used until FIFO 31 receives additional number sequences from remote generation 11. In addition, if a delay or break in communication occurs such that FIFO 31 does not receive additional values for a period of time, FIFO control 32 could operate to effectively move the pointers of FIFO 31 to reuse the last data set (message) thereby allowing values to continue to be fed to circuit 33 albeit with a repetition in the distribution being created for a period of time until communications with remote generation 11 is reestablished.

Note that devices 20 and 30 can be combined depending upon whether it is desired to use the random memory buffer or simply allow the remotely generated number sequence to flow through a FIFO. As discussed above, the circuitry of devices 20 and/or 30 can be constructed using ASIC or FPGA technology or any other technology as desired, and the number sequences in remote generator 11 can be computer generated, circuit generated, or can be generated as a result of the monitoring of actual test results.

Also, note that if bandwidth becomes an important issue at any period of time, each of devices 20, 30 has its own method and system for coping with the inability to continue functioning for a particular time. This is accomplished with respect to FIG. 2 by the RAM being instructed to provide more indexed sequences under control of additionally generated LFSR addresses. While in FIG. 3, FIFO control 32 can change its pointers and reuse data already available.

Although the present invention and advantages thereof have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for generating pseudo-random numbers with a given distribution function for use in a limited capacity device, said system comprising:

a source external to said device configured to send said device a sequence of pseudo-random numbers having a distribution characteristic; and control within said device configured to supply at least a portion of said sequence of pseudo-random numbers for use as a pseudo-random number distribution in said device, wherein said control comprises a memory for receiving and temporarily storing said sequence of pseudo-random numbers, wherein said control is configured to access said memory and generate a plurality of new and different pseudo random sequences based on said stored sequence for use in the device.

2. The system of claim 1 wherein said memory comprises: a FIFO memory.

3. The system of claim 2 further comprising:
control configured to adjust periodically pointers within said FIFO memory to reuse a previously used portion of said sequence of pseudo-random numbers, starting at a different point.

4. The system of claim 1 wherein said memory is configured to store said sequence of pseudo-random numbers at corresponding addresses.

5. The system of claim 4 further comprising:
an address generator configured to pseudo-randomly select addresses of the stored sequence of pseudo-random numbers to provide another sequence of pseudo-random numbers based on the stored sequence of pseudo-random numbers at the selected addresses.

6. The system of claim 5 wherein said address generator comprises a linear feedback shift register (LFSR).

7. The system of claim 1 wherein said pseudo-random number distribution is based on one of actual events; a simulation of actual events according to a certain distribution; or an externally generated pseudo-random number.

8. The system of claim 1 wherein said source sends the sequence of pseudo-random numbers via a wireless channel to said device.

9. The system of claim 8 wherein said wireless channel is outside a normal communication band of said device.

10. The system of claim 1 further comprising:
a plurality of other limited capacity devices; and
control within each said other devices for supplying at least a portion of said sequence of pseudo-random number for use as a pseudo-random number distribution in each said device.

11. The system of claim 10 wherein each of said device and said other devices comprises one of a cell phone, a PDA, a pager and an in-line test probe.

12. A method for delivering a pseudo-random distribution of numbers, said method comprising:
receiving at a device sequences of pseudo-random numbers from an external source, each sequence having a corresponding distribution characteristic;
temporarily storing within said device at least one of said sequences of pseudo-random numbers; and
providing, on a sequence by sequence basis, numbers of the temporarily stored at least one sequence of pseudo-random numbers, under control of circuitry within said device,
whereby a plurality of new and different pseudo-random sequences of the temporarily stored pseudo-random numbers are generated based on said at least one stored sequence, for use in the device.

13. The method of claim 12 wherein the at least one of said sequences pseudo-random numbers is temporarily stored in a FIFO controlled as to start and stop times.

14. The method of claim 13 wherein providing said new sequence comprises:
changing pointers of said FIFO.

15. The method of claim 12 wherein said temporary storing comprises:
storing said at least one of said sequences of pseudo-random numbers in a memory at addressable address locations.

16. The method of claim 15, further comprising:
generating within said device random address locations of the memory to cause said stored at least one of said sequences of pseudo-random numbers to be pseudo-randomly delivered.

17. The method of claim 16 wherein said generating is under control of a linear feedback shift register (LFSR) within said device.

18. An application specific integrated circuit (ASIC) for delivering a pseudo-random distribution of numbers, said ASIC comprising:
means for receiving a sequence of pseudo-random numbers from a source external to a device comprising said ASIC, said sequence of pseudo-random numbers having a distribution type;
means for temporarily storing within said ASIC said sequence of pseudo-random numbers; and
means for delivering at least a portion of said temporarily stored sequence of pseudo-random numbers for use as a pseudo-random number distribution,
whereby a plurality of new and different pseudo-random sequences of the temporarily stored pseudo-random numbers are generated based on said stored sequence, for use in the device.

19. The ASIC of claim 18 wherein said means for temporarily storing comprises a FIFO.

20. The ASIC of claim 18 further comprising:
means for using at least another portion of the stored sequence of pseudo-random numbers for use as another pseudo-random number distribution when a new sequence of pseudo-random numbers from the external source is not available.

21. The ASIC of claim 20 wherein said means for using at least another portion of the stored sequence of pseudo-random numbers comprises:
means for changing internal pointers of said FIFO.

22. The ASIC The system of claim 18 wherein said temporary storing means comprises:
memory for storing said sequence of pseudo-random numbers at addressable address locations.

23. The ASIC of claim 22 further comprising:
means for generating within said device pseudo-random address locations from which to retrieve said stored sequence of pseudo-random numbers in pseudo random fashion.

24. The ASIC of claim 23 wherein said generating means comprises a linear feedback shift register (LFSR) within said device.

25. A communication device comprising:
a receiver for receiving a sequence of pseudo-random numbers from a source external to said device, said sequence having a distribution type and a higher quality than a quality of pseudo-random number sequences that could be generated within said device;
memory for temporarily storing within said device said sequence; and
output control for providing to said device a different sequence of pseudo-random numbers based on said temporarily stored sequence.

26. The device of claim 25 wherein at least said memory and said output control is an application specific integrated circuit (ASIC) within said device.

27. The device of claim 26 wherein said memory comprises a FIFO.

28. The device of claim 26 wherein said memory is arranged for temporarily storing said sequence of pseudo-random numbers at addressable address locations, the system further comprising:

a pseudo-random number generator within said device for generating address locations from which to retrieve said temporarily stored sequence of pseudo-random numbers in a pseudo-random fashion.

29. The device of claim 26 wherein said pseudo-random number generator comprises a linear feedback shift register (LFSR) within said device.

* * * * *